United States Patent [19]

Akano

[11] Patent Number: 4,719,616
[45] Date of Patent: Jan. 12, 1988

[54] COMMUNICATION METHOD AND APPARATUS

[75] Inventor: Shinichi Akano, Shibuya, Japan

[73] Assignee: Yamatake Honeywell, Tokyo, Japan

[21] Appl. No.: 741,647

[22] Filed: Jun. 5, 1985

[30] Foreign Application Priority Data

Sep. 14, 1984 [JP] Japan .................. 59-191655

[51] Int. Cl.⁴ ............ H04J 9/00; H04J 3/12; H04M 11/04
[52] U.S. Cl. .................. 370/11; 370/110.4; 340/310 R
[58] Field of Search ............ 370/24, 11, 110.4; 307/2; 340/310 R, 825.74

[56] References Cited

U.S. PATENT DOCUMENTS

| | | | |
|---|---|---|---|
| 3,718,766 | 2/1973 | Stover | 370/11 |
| 4,097,692 | 6/1978 | Felix | 340/310 R |
| 4,328,579 | 5/1982 | Hashimoto et al. | 370/110.4 |
| 4,477,896 | 10/1984 | Aker | 370/11 |

FOREIGN PATENT DOCUMENTS 52-69506   9/1977   Japan ..................... 370/11

Primary Examiner—Douglas W. Olms
Assistant Examiner—Frank M. Scutch, III
Attorney, Agent, or Firm—Trevor B. Joike; Clyde C. Blinn

[57] ABSTRACT

A method of communicating data between first and second communication apparatus having the steps of transmitting line current from the first communication apparatus to a transmission line interconnecting the first and second communication apparatus, the line current being controlled at an analog value representing analog data and having superimposed thereon a digital signal representing digital data, receiving at the second communication apparatus the analog and digital data transmitted by the first communication apparatus, controlling the transmission line voltage at an analog value for transmitting analog data from the second communication apparatus to the first communication apparatus and superimposing on the voltage containing the analog data a digital signal representing digital data, and receiving at the first communication apparatus the analog and digital data transmitted by the second communication apparatus.

27 Claims, 4 Drawing Figures

COMMUNICATION METHOD AND APPARATUS

BACKGROUND OF THE INVENTION

The present invention relates to a communication method which is adapted for transmission and reception between communication apparatuses connected by a 2-wire system transmission line.

For the remote control of valves in industrial processes, for example, a receiving system called a positioner is generally provided. A signal is sent to this positioner from a central control unit as a current value which changes in the range of 4–20 mA, for example. The receiving apparatus receives this signal and controls devices in accordance with a current value.

However, in this case, the control signal is sent only by way of an analog current value and, therefore, it is impossible to send simultaneously two kinds of data, and when it is required to send a monitor signal to the control unit for control purposes, another transmission line and transmission apparatus must be provided additionally. Moreover, two pairs of transmission lines and transmission apparatus for each direction of transmission are required in case two kinds of data are respectively transmitted or received simultaneously by the control units.

For simultaneous transmission and reception of two kinds of data, the prior art has the disadvantages that the facility cost increases, maintenance and inspection are required for more areas, and the man-hours for preventative work also increases.

The present invention has an object to essentially solve such problems of the prior art and simultaneously provides a very effective communication method which is capable of simultaneously transmitting and receiving two kinds of data.

SUMMARY OF THE INVENTION

Accordingly, the present invention attains this object with the following arrangement.

Namely, a first communication apparatus and a second communication apparatus are connected together by a 2-wire system transmission line, from the first communication apparatus a line current is supplied to the 2-wire system transmission line wherein two kinds of data are transmitted, one as an analog value of the line current and the other as digital data superimposed on the analog value and two kinds of data are received, one as an analog value of the transmission line voltage and the other as digital data superimposed on the analog value of the transmission line voltage, while in the second communication apparatus, the two kinds of data transmitted by the first apparatus are received in accordance with the analog value of the line current and its superimposed digital signal and the two kinds of data received by the first apparatus are transmitted as the analog value of the in-line voltage and its superimposed digital signal.

Further, a plurality of second communication apparatuses may be provided, these being connected in series with each other to the two wire system transmission line and thereby similar transmissions and receptions can be realized.

Accordingly, a total of four data messages can be transmitted over the same transmission line, utilizing analog values of each of the line current and the in-line voltage and the corresponding superimposed digital signals, by a pair of communication apparatuses, and, when two second communication apparatus are connected in series to the first communication apparatus, two kinds of data can be transmitted simultaneously from the first communication apparatus to one of the second communication by the analog value of the line current and its superimposed digital signal and two kinds of data can be transmitted from one of the second communication apparatus by the analog value of the in-line voltage and its superimposed digital signal.

BRIEF DESCRIPTION OF THE DRAWINGS

The present invention is explained hereunder in detail with reference to the attached drawings in which.

DETAILED DESCRIPTION

Figure 2:
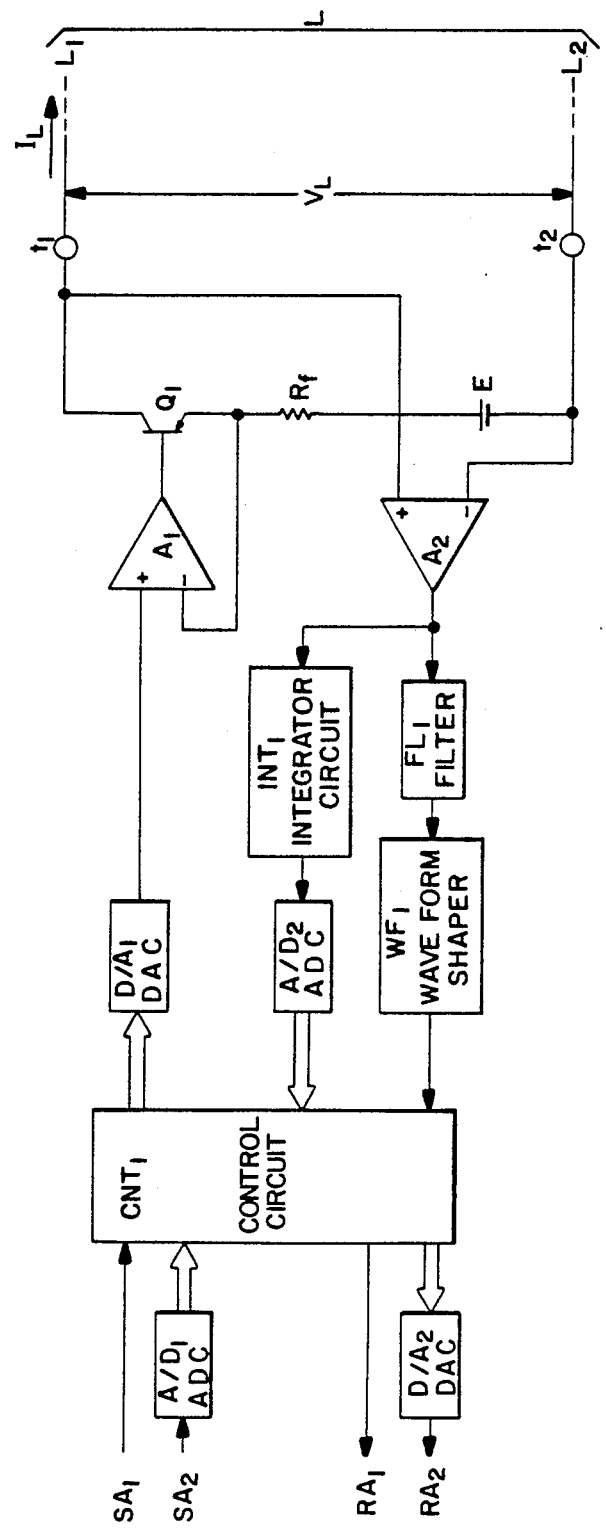
FIG. 2 is a schematic diagram showing a first communication apparatus according to the present invention.

FIG. 2 is a block diagram of one communication apparatus (hereinafter referred to as an apparatus). Sending data $SA_1$ comprised of serial digital signal is directly applied to control unit $CNT_1$ consisting of a processor such as a microprocessor and a memory, etc., while sending data $SA_2$ comprised of an analog signal is applied to control unit $CTN_1$ through an analog to digital converter (hereinafter referred to as ADC) $A/D_1$. Respective signals are converted herein to analog values or coded pulse signals and a pulse signal is superimposed on an analog value. For example, the sending data $SA_1$ is converted to an analog value in a specified range, while the sending data $SA_2$ is converted to a pulse signal indicated by a specified code. A combined value of these signals are sent to a differential amplifier $A_1$ through a digital to analog converter (hereinafter referred to as DAC) $D/A_1$.

Thereby, this amplifier $A_1$ controls a collector to emitter impedance of transistor $Q_1$ in accordance with an analog output of DAC $D/A_1$ and a value of line current $I_L$ to be sent to the transmission line L from the power supply E changes in accordance with a change of impedance of transistor $Q_1$ connected in series to the power supply E between the line terminals $t_1$, $t_2$ which are connected to the lines $L_1$ and $L_2$ forming the 2-wire system transmission line (hereinafter referred to as transmission line) L.

Here, a resistor $R_f$ is connected between the emitter side of transistor $Q_1$ and source E to provide a terminal voltage as a negative feedback to the differential amplifier. Thereby a value of line current $I_L$ is controlled to a value corresponding to an output of DAC $D/A_1$.

Figure 1:
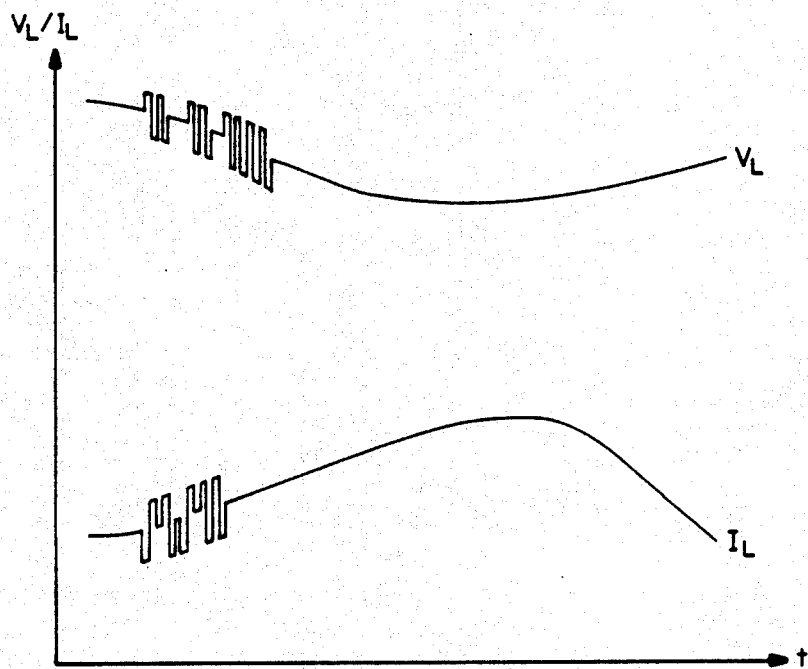
FIG. 1 is a graph showing a typical transmission line voltage and current according to the present invention.

Accordingly, shown in FIG. 1 are examples of changes of line current $I_L$ and in-line voltage $V_L$ of transmission line L. The line current $I_L$ is converted to an analog value corresponding to the sending data $SA_1$ within the range of 4–20 mA, for example. Digital pulses are superimposed thereon in accordance with the sending data $SA_2$.

In this example, a digital change, in the form of a pulse, is considered almost equal in the positive and negative directions, and a change from negative to positive is considered, for example, as a logical "0", while a change from positive to negative is considered as a logical "1".

An analog value and superimposed digital changes of an in-line voltage $V_L$ are also generated in accordance with transmissions by a second apparatus as described later. In this example, changes in positive and negative directions are similar to those described previously but where a logical level "1" which does not change in the next bit time denotes a "0", for example.

Therefore, to detect an analog value with a superimposed digital signal of in-line voltage $V_L$, a differential amplifier $A_2$ having a high input impedance is provided in FIG. 2. Thereby, an in-line voltage $V_L$ is detected so that the digital signal can be eliminated in one circuit by equalizing such detected output with an integrator circuit $INT_1$ to obtain an analog value which is converted to a digital signal by ADC A/D$_2$ and supplied to the control unit $CNT_1$. Simultaneously, in the other circuit leg, the digital signal is separated from the analog valve by a filter $FL_1$ which allows the frequency component of the digital signal to pass. This digital signal is supplied accordingly to the control unit $CNT_1$ as the serial digital signal through a waveform shaper $WF_1$.

The control unit $CNT_1$ carries out its code conversion and decoding process in accordance with these inputs. For example, received data output $RA_1$ in digital form is transmitted in accordance with an analog component of the received signal and received data output $RA_2$ in analog form is transmitted in accordance with the digital component through digital-to-analog converter DAC D/A$_2$.

Power for the apparatus of FIG. 2 is provided by corresponding power supplies.

Figure 3:
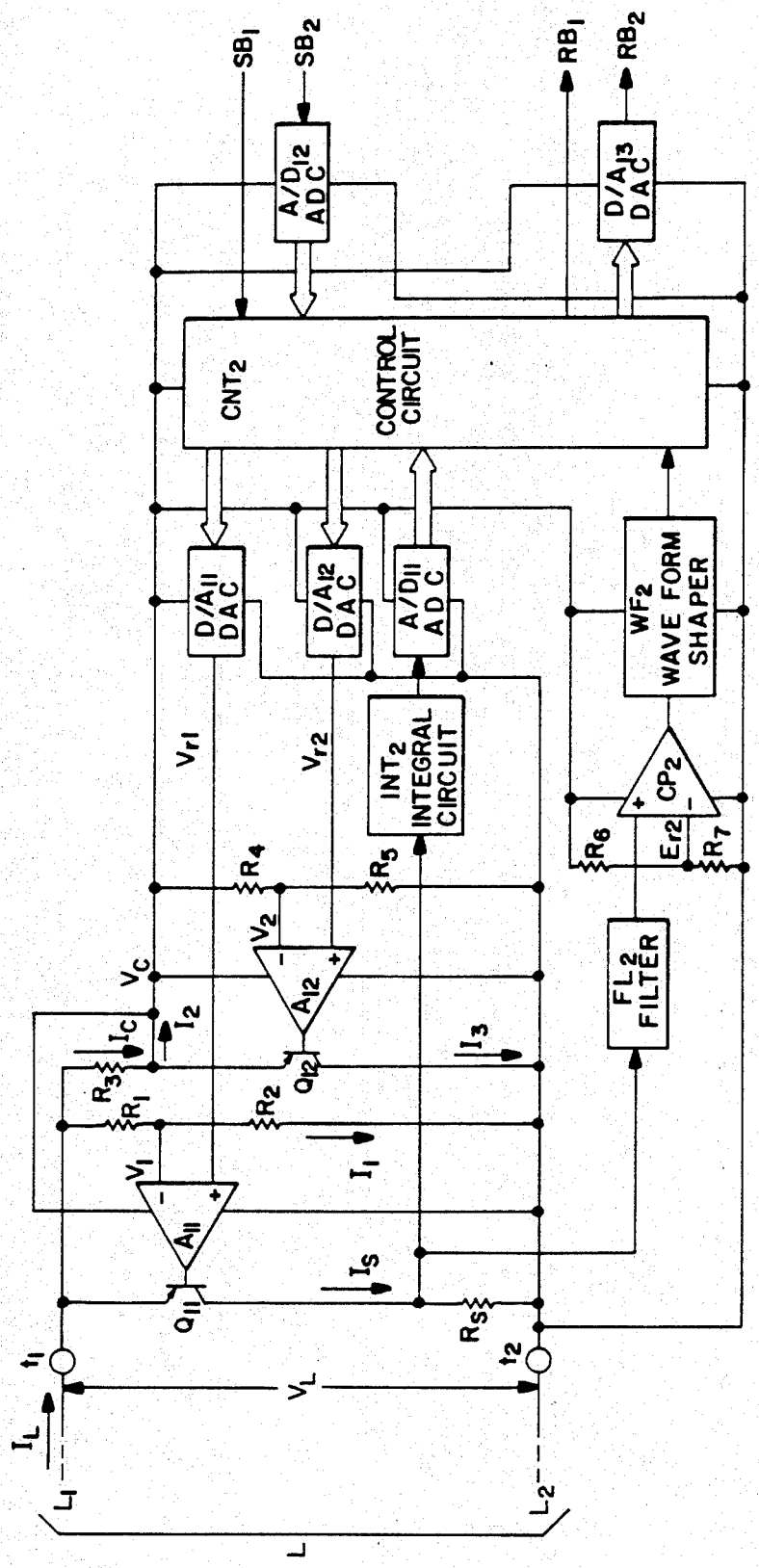
FIG. 3 is a schematic diagram showing a second communication apparatus according to the present invention; and, FIG. 4 is a schematic diagram showing a system in which the first and second communication apparatus are used.

FIG. 3 is a schematic diagram of a second apparatus to be provided in connection with field apparatuses. This apparatus is connected to the transmission line L of FIG. 2 through the line terminals $t_1$, $t_2$. Meanwhile, the emitter and collector of transistor $Q_{11}$ are connected in series with a receiving resistor $R_s$, resistor $R_s$ being connected to the collector side thereof. On the other hand, a divider circuit consisting of resistors $R_1$ and $R_2$ is connected in parallel to transistor $Q_{11}$ and resistor $R_s$ as is a series circuit of resistor $R_3$ and the emitter-collector of transistor $Q_{12}$.

As a load circuit, a circuit consisting of differential amplifiers $A_{11}$, $A_{12}$ and resistors $R_4$-$R_7$, DAC D/A$_{11}$-D/A$_{13}$, ADC A/D$_{11}$, A/D$_{12}$, control unit $CNT_2$ similar to the control unit $CNT_1$, comparator $CP_2$ and waveform shaper $WF_2$ are connected in parallel to the transistor $Q_{12}$, and the control unit $CNT_2$ supplies the reference voltages $V_{r1}$, $V_{r2}$ through DAC D/A$_{11}$, D/A$_{12}$.

Here, the resistors $R_1$, $R_2$ and differential amplifier $A_{11}$ form the first control circuit and controls the impedance of transistor $Q_{11}$ on the basis of the reference voltage $V_{r1}$ supplied from DAC D/A$_{11}$ in a direction to stabilize in-line voltage $V_L$ in accordance with a voltage $V_1$ obtained by dividing the in-line voltage $V_L$ of transmission line L with the resistors $R_1$, $R_2$. Thereby, an in-line voltage $V_L$ is kept to a constant value, for example, of 10 V, without relation to a value of line current $I_L$.

The resistors $R_4$, $R_5$ and differential amplifier $A_{12}$ form the second control circuit and controls an impedance of transistor $Q_{12}$ on the basis of the reference voltage $V_{r2}$ supplied by DAC D/A$_{12}$ in a direction to stabilize a value of current $I_c$ applied to the resistor $R_3$ in accordance with a voltage $V_2$ obtained by dividing a load circuit voltage $V_c$ of resistor $R_3$ with the resistors $R_4$, $R_5$. Thereby, a current $I_c$ is kept at a constant value of 4 mA, for example, without relation to a power supply current of each load circuit.

Accordingly, if the resistors $R_1$, $R_2$ have high resistance values so that current $I_1$ applied thereto can be neglected, the current flowing through resistor $R_s$ can be expressed as $I_s = I_L - I_c$. The current $I_s$ is formed only by the signal component of $I_c$, for example of 0–16 mA, by setting the current $I_c$ equal to the bias component of $I_L$, for example of 4 mA. Therefore, a terminal voltage $V_s$ of resistor $R_s$ indicates the transmitted data SA$_1$ from the first apparatus shown in FIG. 2 corresponding to an analog value of the line current $I_L$ by integrating such voltage $V_s$ by integrator circuit $INT_2$ and then applying it to control unit $CNT_2$ after it is converted to a digital signal by ADC A/D$_{11}$.

Moreover, a frequency component representing a digital signal is extracted from the terminal voltage $V_s$ with a filter $FL_2$, which component is compared by comparator $CP_2$ with a reference voltage $E_{r2}$ preset by the resistors $R_6$, $R_7$. The digital component is applied to the control unit $CNT_2$ through the waveform shaper $WF_2$. Thereby, such terminal voltage $V_s$ also indicates transmitted data SA$_2$ corresponding to digital signal imposed on line current $I_L$.

These sending data SA$_1$, SA$_2$ can be received simultaneously by converting and decoding this signal in the control unit $CNT_2$ and supplying it as received data RB$_1$ in the form of a series digital signal in accordance with the transmitted data SA$_1$ and also supplying it as received data RB$_2$ in the form of an analog signal from DAC D/A$_{13}$ in accordance with the transmitted data SA$_2$.

In FIG. 3, negative feedback is provided for the differential amplifiers $A_{11}$, $A_{12}$ by such operations and the following relationships exists therefore because $V_1 = V_{r1}$, $V_2 = V_{r2}$:

$$V_1 = V_L[R_2/(R_1+R_2)] = V_{r1}$$

$$V_L = V_{r1}[1+(R_1/R_2)] \quad (1)$$

$$V_2 = V_c[R_5/(R_4+R_5)] = V_{r2}$$

$$V_c = V_{r2}[1+(R_4/R_5)] \quad (2)$$

In this case, since $V_{r1}$, $V_{r2}$ are stabilized so long as the data sent from the control unit $CNT_1$ is constant, $V_L$, $V_c$ also become constant and the following relationship can be obtained:

$$I_c = (V_L - V_c)/R_3 \quad (3)$$

Namely, $I_c$ becomes constant. On the other hand, a line current $I_L$ is expressed by the following equation:

$$I_L = I_1 + I_2 + I_3 + I_s = I_1 + I_c + I_s \quad (4)$$

Here, when $I_1 = 0$, $$I_s = I_L - I_c \quad (5)$$

Therefore, if $I_L$ is 4–20 mA, for example, $I_s = 0$–16 mA by setting $I_c$ to 4 mA ($I_c = 4$ mA), the reception of data being indicated by $I_s$. Accordingly, a power supply current to a maximum of 4 mA can be supplied stably to each load circuit.

In the apparatus side of FIG. 2, a line current $I_L$ is transmitted by a constant current circuit of the differential amplifier $A_1$ to transistor $Q_1$, and the current value is not influenced even when the input impedance of the FIG. 3 receiver changes.

On the other hand, for the transmission to the apparatus shown in FIG. 2 of data such as actually measured values, the control unit $CNT_2$ changes both in an analog manner and in a digital manner the voltage $V_L$ through DAC $D/A_{11}$, $D/A_{12}$ by changing reference voltages $V_{r1}$, $V_{r2}$ while at the same time keeping current $I_c$ constant. Accordingly, the analog value of in-line voltage $V_L$ changes and digital data is superimposed thereon so that transmission is carried out. Two kinds of data are thus indicated simultaneously by the analog value and the code which changes digitally.

Namely, the value of current $I_c$ can be kept constant by keeping constant the numerator of equation (3) and the following equation can be obtained from equations (1) and (2) by setting the value of $V_L - V_c$ to $V_R$:

$$V_L - V_c = V_R = V_{r1}[1+(R_1/R_2)] - V_{r2}[1+(R_4/R_5)]$$

$$V_{r2} = [V_{r1}\{1+(R_1/R_2)\} - V_R][1/\{1+(R_4/R_5)\}] \quad (6)$$

Here, if the following relationship exists:

$$R_2/(R_1+R_2) = R_5/(R_4+R_5) = K \quad (7)$$

then from equations (6) and (7), the following relationship can be obtained:

$$V_{r2} = [V_{r1}(1/K) - V_R]K = V_{r1} - V_R K \quad (8)$$

Therefore, the in-line voltage $V_L$ can be freely increased or decreased while the current $I_c$ is kept, for example, to 4 mA by simultaneously changing the data to ADC $A/D_{11}$, $A/D_{12}$ while maintaining the relationship shown in equation (8), and thereby transmission can be realized in accordance with changes of voltage while data are received in accordance with current value.

If a change of voltage $V_c$ affects the operations of the load circuits, it is only required to insert a voltage stabilizing circuit to that part of the circuit where current $I_2$ flows and the circuit of resistors $R_4$ and $R_5$ to the input side thereof.

As explained above, in FIG. 3, the digital data $SB_1$ to be transmitted is directly applied to control unit $CNT_2$, while the analog data $SB_2$ to be transmitted is supplied through ADC $A/D_{12}$, in order to provide transmission in accordance with changes of in-line voltage $V_L$. The control unit $CNT_2$ converts and encodes these input signals. For example, after data $SB_1$ is converted to the analog value and data $SB_2$ is encoded to the digital changes, $CNT_2$ superimposes the digital data on the analog signal in order to combine them, control simultaneously the reference voltages $V_{r1}$, $V_{r2}$ on the basis of the equation (8) in accordance with such combined value, and transmits the signal as the change of in-line voltage $V_L$ shown in FIG. 1.

Accordingly, supply of power is carried out simultaneously by only the 2-wire system transmisison line, two kinds of data $SA_1$, $SA_2$ and $SB_1$, $SB_2$ can be transmitted and received by only a pair of apparatuses and thereby the facility cost and the man-hours required for maintenance and checking can be reduced remarkably.

Figure 4:
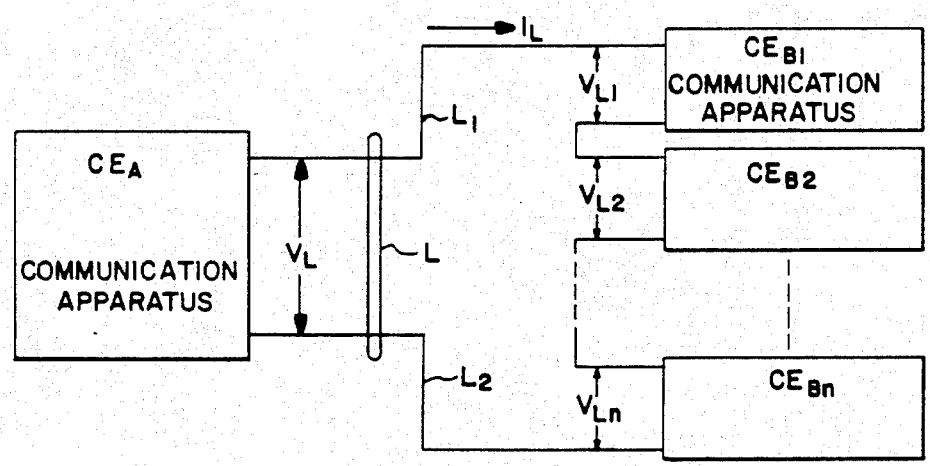

FIG. 4 is a block diagram indicating the various aspects of the invention, wherein a first apparatus $CE_A$ is connected to the one end of transmission line L while a plurality of the other apparatuses $CE_{B1}$-$CE_{Bn}$ are connected in series with each other to the other end of the transmission line L, wherein a signal is transmitted from the apparatus $CE_A$ by the line current $I_L$ as in the case of FIG. 1 and such signal is simultaneously received by the apparatuses $CE_{B1}$-$CE_{Bn}$, and moreover, for example, a corresponding apparatus among $CE_{B1}$-$CE_{Bn}$ changes the corresponding in-line voltage among $V_{L1}$-$V_{Ln}$ as shown in FIG. 1 in accordance with the polling signal indicated by a digital change of line current $I_L$.

In this case, since $V_L = V_{L1} + V_{L2} + \ldots V_{Ln}$, a responsive transmission signal is received by the apparatus $CE_A$, and transmission/reception of two kinds of data by an analog value of line current $I_L$ and a superimposed digital signal and transmission/reception of two kinds of data by an analog value of in-line voltage $V_L$ and a superimposed digital signal can be realized simultaneously.

In this case, transmission from the apparatus $CE_A$ is received in common by the apparatuses $CE_{B1}$-$CE_{Bn}$, while transmission from the apparatuses $CE_{B1}$-$CE_{Bn}$ are received only by the apparatus $CE_A$. Therefore, the present invention can be adapted to various kinds of both-way multiplex communication systems by individually defining an analog value changing range and absolute value of in-line voltages $V_{L1}$-$V_{Ln}$ or providing a means which indicates address codes in accordance with digital changes.

The common use of transmission line L can be realized through the simultaneous transmission of two kinds of data to the apparatuses $CE_{B1}$-$CE_{Bn}$ from the apparatus $CE_A$ by only connecting the apparatus $CE_A$ and a plurality of apparatuses $CE_{B1}$-$CE_{Bn}$ with only a single transmission line L and also through the simultaneous transmission of two kinds of data to the apparatus $CE_A$ from any of the apparatuses $CE_{B1}$-$CE_{Bn}$.

However, in FIG. 1, it is effective to obtain an analog value through equalization of setting in common the positive and negative amplitude of the waveform indicating the digital signal but it is also possible to provide such a digital signal only in the positive or negative direction in accordance with the conditions, and, thus, the waveform indicating a "0" or "1" can be selected freely.

In FIGS. 2 and 3, the transistors $Q_1$, $Q_{11}$, $Q_{12}$ can be replaced with controllable variable impedance elements such as field effect transistors or photocouplers. A similar effect can also be obtained by replacing the resistors $R_f$, $R_s$, $R_3$ with impedance elements such as diodes or by utilizing circuits having a current detecting function in place of resistor $R_s$. The converter ADC or DAC may be inserted or omitted in accordance with the requirements of the apparatuses of the remote stations for the transmitting data $SA_1$, $SA_2$, $SB_1$, $SB_2$ and for the receiving data $RA_1$, $RA_2$, $RB_1$, $RB_2$. Moreover, the control circuits $CNT_1$, $CNT_2$ may be formed through combinations of various logic circuits or may be formed by an analog circuit.

In FIG. 3, it is possible to generate the reference voltages $V_{r1}$, $V_{r2}$ with constant voltage diodes in place of using DAC $D/A_{11}$, $D/A_{12}$ and to select such voltages for transmission.

In addition, the bias component of line current $I_L$ may be determined in accordance with the required power supply current of a load circuit. A motor, for example, can be included in the load circuit. Further, in industrial processes, the apparatuses $CE_{B1}$-$CE_{Bn}$ are provided to control such devices as valves, pumps, and dumpers and preset value and command information can be transmitted from the apparatus $CE_A$. On the other hand, the current representing the actually measured value and monitor data are transmitted from the apparatuses $CE_{B1}$-$CE_{Bn}$. Namely, the present invention can be adapted for various kinds of remote controls and for monitoring through various modifications.

The embodiments of the invention in which an exclusive property or right is claimed are defined as follows:

1. In a communication system having a first communication apparatus connected to a second communication apparatus over a 2-wire transmission line, a method of communicating data between the first and second communication apparatus comprising:
   transmitting line current from the first communication apparatus to the transmission line with an analog value representing analog data and having superimposed thereon a digital signal representing digital data;
   receiving at the second communication apparatus the analog and digital data transmitted by said first communication apparatus;
   controlling at the second communication apparatus a voltage across the transmission line at an analog value for transmitting analog data from the second communication apparatus to the first communication apparatus and superimposing on the voltage containing the analog data a digital signal representing digital data; and,
   receiving at said first communication apparatus the analog and digital data transmitted by the second communication apparatus.

2. A communication apparatus comprising:
   terminal means for connection to a 2-wire transmission line;
   transmission means connected to said terminal means for controlling an analog value of a first signal on said transmission line for transmitting analog data over said transmission line and for superimposing upon said analog value a digital signal for transmitting digital data over said transmission line, said transmission means comprising an analog control device and a digital processor connected thereto for controlling the analog value of said first signal; and,
   receiving means connected to said terminal means for receiving an analog value of a signal on said transmission line, said analog value having a value in accordance with analog data received, and for receiving digital data superimposed upon the analog value of the received analog data.

3. The apparatus of claim 2 wherein said digital processor means comprises digital-to-analog converter means for providing an analog control voltage to said analog control device for controlling the analog value of said signal.

4. The apparatus of claim 3 wherein said analog control device comprises a transistor having collector and emitter means connected to said terminal means and a base, said analog control device further comprising an amplifier having an input connected to an output of said digital-to-analog converter means and having an output connected to the base of said transistor.

5. The apparatus of claim 4 wherein said receiver means comprises filter means for filtering out said received analog data in order to supply said received digital data to said digital processor means.

6. The apparatus of claim 5 wherein said receiver means comprises an integrator and an analog-to-digital converter responsive to said signal received at said terminal means from said transmission line in order to supply said analog data in digital form to said digital processing means.

7. The apparatus of claim 2 wherein said transmission means comprises a first transistor and a receiving resistor connected in series to said terminal means.

8. The apparatus of claim 7 wherein said transmission means comprises a second transistor and a series resistor connected in series to said terminal means.

9. The apparatus of claim 8 wherein said transmission means comprises control means for controlling said first and second transistors in a manner to transmit said transmitted analog and digital data while at the same time maintaining a current flowing through said series resistor constant.

10. The apparatus of claim 9 wherein said control means comprises a first differential amplifier having a first input connected to a voltage divider which is connected to said terminal means and a second input, said first differential amplifier having an output connected to said first transistor, said control means also having a second differential amplifier having a first input connected to a voltage divider connected in parallel to said second transistor and having a second input, said second differential amplifier having an output connected to said second transistor.

11. The apparatus of claim 10 wherein said control means comprises a processor for providing reference voltages to said first and second inputs of said first and second differential amplifiers.

12. The apparatus of claim 11 wherein said receiving means comprises filter means connected to said receiving resistor for filtering out said analog value of said received analog data for supplying said digital data.

13. The apparatus of claim 12 wherein said receiving means comprises an integrator and an analog-to-digital converter for supplying said received analog data.

14. A communication system comprising:
   a 2-wire transmission line;
   a first communication apparatus connected to said transmission line for transmitting a line current over said transmission line, said line current having an analog value in accordance with analog data to be transmitted by said first communication apparatus and having superimposed thereon digital data also transmitted by said first communication apparatus; and,
   second communication apparatus connected to said transmission line for controlling a voltage across said transmission line, said voltage being controlled at an analog value representing analog data to be transmitted by said second communication apparatus, said second communication apparatus superimposing digital data on the analog value of the line voltage in accordance with digital data to be transmitted by the second communication apparatus.

15. The apparatus of claim 14 wherein said first communication apparatus comprises an analog control device connected to said transmission line for controlling the analog value of said line current.

16. The apparatus of claim 15 wherein said first communication apparatus comprises digital processor means connected to said analog control device for controlling the analog value of said line current.

17. The apparatus of claim 16 wherein said digital processor means comprises digital-to-analog converter means for providing an analog control voltage to said analog control device for controlling the analog value of said line current.

18. The apparatus of claim 17 wherein said analog control device comprises a transistor having collector and emitter means connected to said transmission line and a base, said analog control device further comprising an amplifier having an input connected to an output of said digital-to-analog converter means and having an output connected to the base of said transistor.

19. The apparatus of claim 15 wherein said first communication apparatus comprises filter means for filtering out received analog data in order to supply received digital data superimposed upon said analog data to said digital processor means.

20. The apparatus of claim 19 wherein said first communication apparatus comprises an integrator and an analog-to-digital converter responsive to a received signal received from said transmission line in order to supply analog data contained in said received signal in digital form to said digital processing means.

21. The apparatus of claim 14 wherein said second communication apparatus comprises a first transistor and a receiving resistor connected in series to said transmission line.

22. The apparatus of claim 21 wherein said second communication apparatus comprises a second transistor and a series resistor connected in series to said transmission line.

23. The apparatus of claim 22 wherein said second communication apparatus comprises control means for controlling said first and second transistors in a manner to transmit analog and digital data while at the same time maintaining a current flowing through said series resistor constant.

24. The apparatus of claim 23 wherein said control means comprises a first differential amplifier having a first input connected to a voltage divider which is connected to said transmission line and a second input, said first differential amplifier having an output connected to said first transistor, said control means also having a second differential amplifier having a first input connected to a voltage divider connected in parallel to said second transistor and having a second input, said second differential amplifier having an output connected to said second transistor.

25. The apparatus of claim 24 wherein said control means comprises a processor for providing reference voltages to said first and second inputs of said first and second differential amplifiers.

26. The apparatus of claim 25 wherein said second communication apparatus comprises filter means connected to said receiving resistor for filtering out said analog value of said received analog data for supplying said digital data.

27. The apparatus of claim 26 wherein said receiving means comprises an integrator and an analog-to-digital converter for supplying said received analog data.

* * * * *